C. L. SMITH.
REAR AXLE CONSTRUCTION FOR MOTOR VEHICLES.
APPLICATION FILED MAY 14, 1913.
1,138,900.
Patented May 11, 1915.
2 SHEETS—SHEET 1.
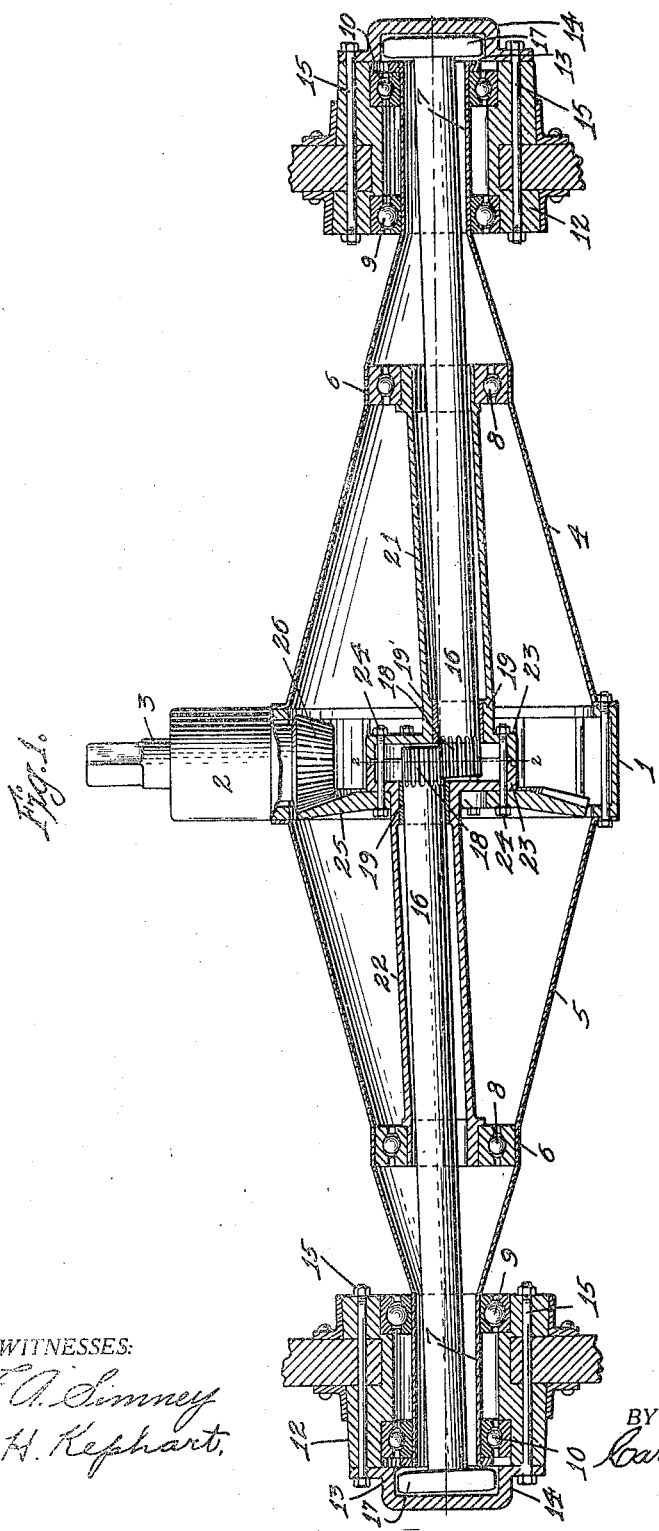
WITNESSES:
INVENTOR.
CHARLES L. SMITH.
BY
ATTORNEY.

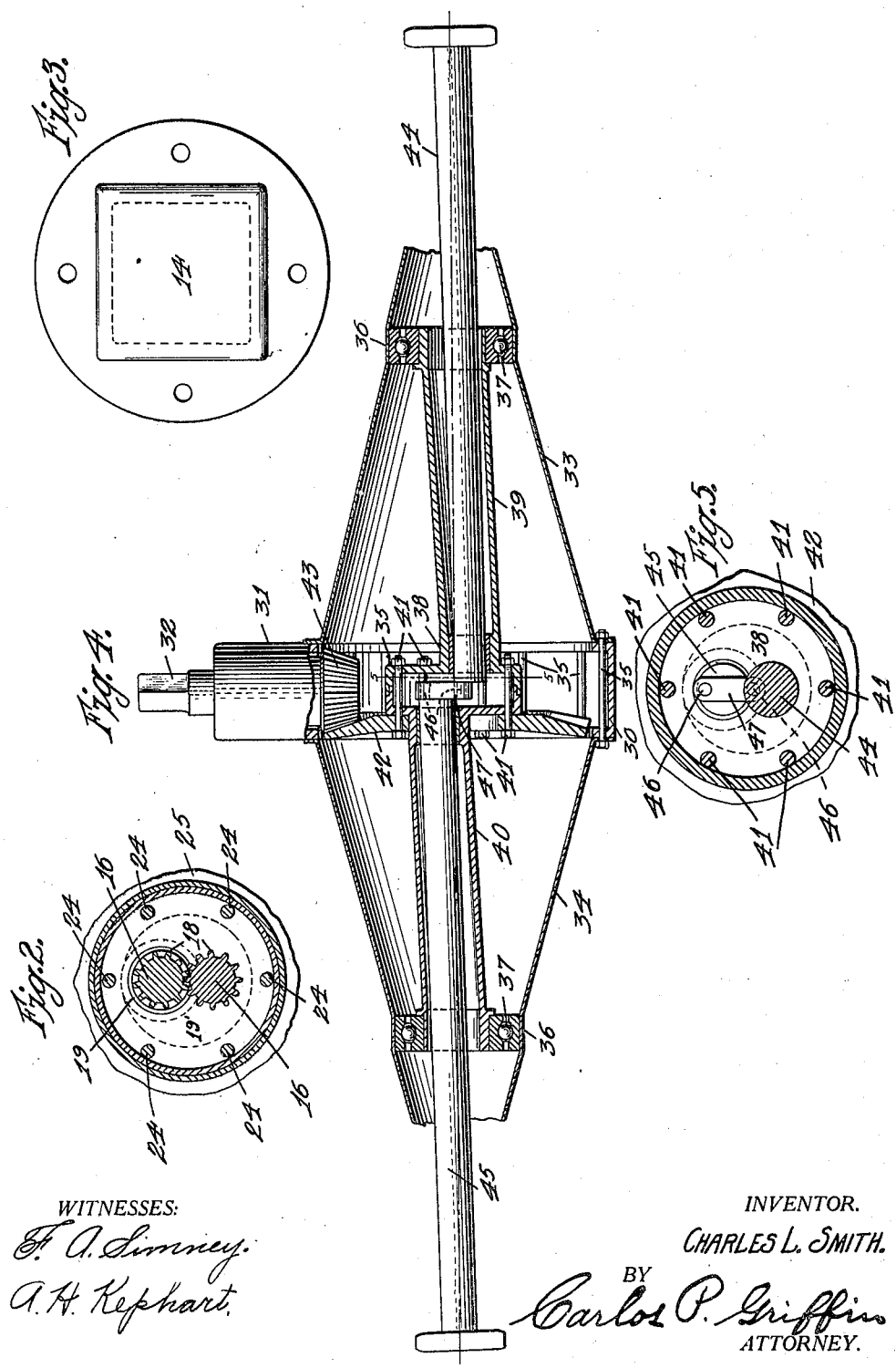

UNITED STATES PATENT OFFICE.

CHARLES L. SMITH, OF SAN FRANCISCO, CALIFORNIA.

REAR-AXLE CONSTRUCTION FOR MOTOR-VEHICLES.

1,138,900.  Specification of Letters Patent.  Patented May 11, 1915.

Application filed May 14, 1913. Serial No. 767,660.

*To all whom it may concern:*

Be it known that I, CHARLES L. SMITH, a citizen of the United States, residing at San Francisco, in the county of San Francisco and State of California, have invented a new and useful Rear Axle Construction for Motor-Vehicles, of which the following is a specification, in such full and clear terms as will enable those skilled in the art to construct and use the same.

This invention relates to a differential for motor vehicles and its object is to simplify the usual construction thereof by the elimination of a number of gears commonly used therein.

Another object of the invention is to produce a differential which can be assembled by the mere insertion thereinto of the driving axle for the wheels.

An embodiment of the invention is shown in the drawings in which the same reference numeral is applied to the same portion throughout, but I am aware that there are many modifications thereof.

Figure 1 is a longitudinal sectional view of the axle housing showing the manner of constructing the differential, Fig. 2 is a view on the transverse section plane indicated at 2—2 Fig. 1, Fig. 3 is a view of the wheel driving cap, Fig. 4 is a longitudinal sectional view of a slightly modified form of the invention in which a link takes the place of the two gears on the ends of the shafts, and Fig. 5 is a sectional view on the line 5—5 Fig. 4.

The numeral 1 represents a cylinder like shell having a bearing at 2 for the stub shaft 3. The shell 1 has the tubular shells 4 and 5 secured thereto, each of said shells being more or less cone shaped and having cylindrical portions at 6 and 7 for ball bearings, 8, 9 and 10. The ball bearings 8 of which there is one in each of the shells 4 and 5 are placed within said shells at a distance from the center of the axle, while each shell has ball bearings 9 and 10 surrounding it at its ends, each of which bearings support a wheel hub 12, said hubs being of a well known construction.

The bearings 9 and 10 are inserted in recesses in the wheel hub and are then pushed on over the outside of the cylindrical portion of the outer part of the axle, after which a ring 13 is screwed on the end of the cylindrical portion 7 to hold the bearings and wheel in place, the inner bearing 9 being pressed against the adjacent coned portion of the shell 4. Each wheel hub has a cap 14 secured thereto by means of suitable bolts 15 which cap has a square recess therein for the head of the live axle 16.

The live axle 16 has a squared head 17 suitably rounded to permit the distant end thereof to move out of the axis of the wheel hub, while at the same time rotating said wheel hub. The inner end of the live axle 16 has gear teeth formed thereon as shown at 18 and it is journaled in a sleeve 19, which sleeve is supported by the bearings 8 at a distance from the geared ends of the two live axles 16. The shafts 16, or live axles, are journaled in bushings 19′ forced into the members 21 and 22 adjacent the geared ends of said shafts.

The sleeve 19 is composed of two tubular members 21 and 22, each of which has an enlargement at 23 to provide for securing the other thereto. The enlarged portions 23 are bored to receive bolts 24, which bolts also hold the large bevel gear 25 in place. The large bevel gear is in mesh with a small bevel pinion 26 carried by the stub shaft 3.

In operation the large bevel gear 25 is rotated and as it rotates the member 19 rotates and carries the live shafts 16 around with it, the inner ends of said shaft moving in a circle concentric with the axis of the wheel hubs with the center of the pinions formed thereon eccentric to said axis by an amount equal to the radius of the pitch circle of said gears. This movement will cause the head 17 to move slightly in the hub caps 14, but inasmuch as in a full sized machine the eccentricity causes said live axles to part only about one degree from the wheel hub axis. This movement makes practically no difference in the driving of the vehicle, and it permits the well known differential effect in which one wheel is permitted to rotate faster than the other should it be necessary, or both are driven straight ahead when required.

In the modified form of the invention the cylindrical shell of the axle is shown at 30, 31 indicating the bearing for the stub shaft 32. The cylindrical portion of the axle has the conical shells 33 and 34 secured thereto by means of the bolts 35 and the ends of said shells are substantially like those in Fig. 1, but not shown in this figure. At 36 each shell is provided with a cylindrical portion for receiving suitable annular ball bearings 37, which bearings support the sleeve 38.

The sleeve 38 is made up of two parts 39 and 40, substantially the same as the sleeve used in the other form of the invention, which two parts are held together by means of the bolts 41 passing through the central flanges thereof and through the flange of the bevel gear 42, which gear is in mesh with the pinion 43 on the stub shaft. Journaled in two bearings at the center of the sleeve are two live shafts 44 and 45, said shafts being offset at their adjacent ends by such an amount as is necessary to properly drive them and each of them is provided with an eccentrically placed pin as indicated at 46. These pins are connected by means of a link 47 of such a length as to permit the rotation of said shafts, which rotation will, if the demand is made upon said shafts give the well known differential effect of allowing one wheel to move faster than the other, but owing to the eccentric position of the inner ends of the two shafts they will be compelled to rotate the hub connected with their outer ends to drive the vehicle forward.

Having thus described my invention what I claim as new and desire to secure by Letters Patent of the United States, is as follows, modifications within the scope of the claims being expressly reserved:

1. A rear axle construction for vehicles comprising a hollow, rigid supporting axle carrying wheel hubs at its outer ends, two live axles out of alinement with each other each having an angular head at the outer ends thereof, a cap connected with the wheel hub and operatively connecting each of said wheel hubs with the heads on the live axles, means for holding the inner ends of the live axles out of the axis of rotation of the wheel hubs, and means to connect the inner ends of said live axles to permit one to rotate around and in a different direction from the other.

2. A rear axle construction for vehicles comprising a rigid supporting axle having a wheel hub mounted thereon at each end thereof, two live axles out of alinement with each other within said rigid axle, each having an angular head on its outer end, means to loosely connect each live axle with the adjacent wheel hub, means to hold the inner ends of said axles out of alinement with the axis of rotation of the wheel hubs, a gear carried by the inner end of each live axle and in mesh with the gear on the adjacent live axle, and means to rotate said shafts to drive the wheel hubs.

3. A rear axle construction for vehicles comprising a rigid supporting axle having wheel hubs at its outer end, a revoluble sleeve within the rigid axle, means to rotate said sleeve, two live axles out of alinement with each other extending into the sleeve, each axle having its axis out of alinement with the axis of rotation of the wheel hubs and having an angular head on its outer end, means connected with the wheel hubs for operatively and loosely connecting the angular head with the wheel hub, and means at the adjacent ends of the two live axles for permitting them to rotate in reverse directions when required and also to permit the inner ends of said axles to rotate around each other.

In testimony whereof I have hereunto set my hand this 8th day of May A. D. 1913, in the presence of the two subscribed witnesses.

CHARLES L. SMITH.

Witnesses:
C. P. GRIFFIN,
L. H. ANDERSON.

Copies of this patent may be obtained for five cents each, by addressing the "Commissioner of Patents, Washington, D. C."